(12) United States Patent
Matsuura

(10) Patent No.: US 8,724,476 B2
(45) Date of Patent: May 13, 2014

(54) WIRELESS LAN DEVICE AND CONTROLLING METHOD THEREOF

(75) Inventor: Nagahiro Matsuura, Nagoya (JP)

(73) Assignee: Buffalo Inc., Nagoya-shi (JP)

(*) Notice: Subject to any disclaimer, the term of this patent is extended or adjusted under 35 U.S.C. 154(b) by 101 days.

(21) Appl. No.: 13/308,856

(22) Filed: Dec. 1, 2011

(65) Prior Publication Data

US 2012/0213086 A1  Aug. 23, 2012

(30) Foreign Application Priority Data

Dec. 2, 2010  (JP) ................ P2010-269451

(51) Int. Cl.
*H04L 12/26* (2006.01)

(52) U.S. Cl.
CPC ....................... *H04L 43/50* (2013.01)
USPC .......................... 370/241; 370/338

(58) Field of Classification Search
CPC .................. H04L 43/00; H04L 12/00
USPC .......... 370/241, 252, 329, 352; 455/423, 448, 455/450
See application file for complete search history.

(56) References Cited

U.S. PATENT DOCUMENTS 7,599,686 B2 * 10/2009 Quinn et al. .................. 455/423
7,668,102 B2 * 2/2010 Li et al. ........................ 370/236
7,809,020 B2 * 10/2010 Douglas et al. ............... 370/474
7,881,273 B2 * 2/2011 Yamaura ...................... 370/338
2010/0329165 A1 * 12/2010 Matsuura ...................... 370/311

FOREIGN PATENT DOCUMENTS

| JP | 2005-210616 A | 8/2005 |
| JP | 2007-325041 | 12/2007 |
| JP | 2009-278368 A | 11/2009 |

OTHER PUBLICATIONS

Japanese Office Action issued Oct. 2, 2012 in Patent Application No. 2010-269451 with English Translation.

* cited by examiner

*Primary Examiner* — Andrew Lai
*Assistant Examiner* — Sumitra Ganguly
(74) *Attorney, Agent, or Firm* — Oblon, Spivak, McClelland, Maier & Neustadt, L.L.P.

(57) ABSTRACT

A wireless LAN device for wirelessly communicating using a specific frequency channel shared by a radar and a wireless LAN system. The wireless LAN device includes a plurality of antennas; a wireless communication unit including a plurality of transceiver circuits respectively provided for each of the plurality of antennas; and a controller that controls the wireless communication unit. The wireless communication unit wirelessly communicates in accordance with a multiple input multiple output (MIMO) scheme by the plurality of transceiver circuits, and the controller controls the wireless communication unit to execute radar wave monitoring on a frequency channel different from a frequency channel in use for wireless communication using one of the plurality of transceiver circuits when the frequency channel in use for the wireless communication is the specific frequency channel.

15 Claims, 11 Drawing Sheets

WIRELESS LAN DEVICE AND CONTROLLING METHOD THEREOF

CROSS REFERENCE TO RELATED APPLICATION

This application is based upon and claims the benefit of priority from Japanese Patent Application No. 2010-269451 filed on Dec. 2, 2010; all the contents of which are incorporated herein by reference.

BACKGROUND OF THE DISCLOSURE

1. Field of the Disclosure

This disclosure relates to a wireless LAN device for wirelessly communicating in accordance with a multiple input multiple output (MIMO) scheme in a wireless LAN system and to a controlling method thereof.

2. Description of the Related Art

In order to utilize available frequency band efficiently, wireless LAN systems in recent years employ a multiple input multiple output (MIMO) scheme in which a transmitter simultaneously transmits plural streams (data series) in the same frequency band through plural antennas, a receiver also receives the streams through plural antennas and then splits the streams into individual streams. This MIMO scheme can improve frequency usage efficiency and increase a data transmission rate.

Moreover, in addition to conventionally used 2.4 GHz band, such wireless LAN systems can also use the 5 GHz band such as frequency channels 36, 40, 44, and 48 included in the 5.15 to 5.25 GHz band called W52, frequency channels 52, 56, 60, and 64 included in the 5.25 to 5.35 GHz band called W53, or frequency channels 100, 104, . . . , and 140 included in the 5.47 to 5.725 GHz band called W56.

However, mobile marine, aircraft, and military radars and fixed weather radars are uses the frequency bands W53 and W56 and thus the wireless LAN systems share these frequency bands with the radars. Accordingly, an access point serving as a master station in a wireless LAN system is required to have dynamic frequency selection (DFS) for avoiding an interference with radar waves (see Japanese Patent Application Publication No. 2007-325041, for example).

The DFS includes functions of monitoring before operation and monitoring during operation for radar waves as well as vacation and reuse restriction. In the following description, the frequency bands including W53 and W56 which require the DFS will be referred to as "DFS bands" while the other frequency bands including W52 which do not require the DFS will be referred to as "non-DFS bands".

The monitoring before operation is referred to as Channel Availability Check (CAC) which is a function to monitor radar waves for one minute in a frequency channel included in the DFS band before communication in the frequency channel is started and to check that no radar waves are detected in that channel. The frequency channel cannot be used if any radar wave is detected.

The monitoring during operation is referred to as In-Service Monitoring (ISM) which is a function to continuously monitor the radar waves in the frequency channel during communication in the frequency channel included in the DFS band. If a radar wave is detected, the access point causes a wireless LAN terminal serving as a communication counterpart to stop the communication using the frequency channel within 10 seconds and to resume the communication using another frequency channel.

The reuse restriction is a function to prohibit the communication in the frequency channel in which the radar wave is detected for 30 minutes after the point of detection.

SUMMARY

When the access point attempts to resume the communication in the other frequency channel included in the DFS band after detection of the radar wave during the communication in the original frequency channel included in the DFS band, the access point needs to carry out the above-described CAC. As a consequence, the access point cannot resume the communication at least for one minute. Hence the access point cannot communicate for a long period.

One conceivable way to avoid such a problem is to add a circuit dedicated to monitoring the radar waves to the access point so as to monitor radar waves in the other frequency channel by using the circuit dedicated to monitoring during communication in the original frequency channel included in the DFS band. However, this method leads to increases in the size and costs of the access point by with the circuit dedicated to monitoring added.

It is therefore an object of this disclosure to provide a wireless LAN device which is capable of avoiding occurrence of a communication failure over a long period while suppressing increases in the size and costs and to provide a controlling method thereof.

According to a first embodiment, the disclosure is directed to a wireless LAN device for wirelessly communicating using a specific frequency channel shared by a radar and a wireless LAN system. The wireless LAN device includes a plurality of antennas; a wireless communication unit including a plurality of transceiver circuits respectively provided for each of the plurality of antennas; and a controller that controls the wireless communication unit. The wireless communication unit wirelessly communicates in accordance with a multiple input multiple output (MIMO) scheme by the plurality of transceiver circuits, and the controller controls the wireless communication unit to execute radar wave monitoring on a frequency channel different from a frequency channel in use for wireless communication using one of the plurality of transceiver circuits when the frequency channel in use for the wireless communication is the specific frequency channel.

According to another embodiment, the disclosure is directed to a method of communicating performed by a wireless local area network (LAN) device that wirelessly communicates using a specific frequency channel shared by a radar and a wireless LAN system. The method includes wirelessly communicating in accordance with a multiple input multiple output (MIMO) scheme using a plurality of transceiver circuits respectively provided for each of a plurality of antennas, and executing radar wave monitoring on a frequency channel different from a frequency channel in use for wireless communication using one of the plurality of transceiver circuits when the frequency channel in use for the wireless communication is the specific frequency channel.

According to another embodiment, the disclosure is directed to a non-transitory computer-readable medium including computer program instructions, when executed by a wireless local area network (LAN) device that wirelessly communicates using a specific frequency channel shared by a radar and a wireless LAN system, causes the wireless LAN device to perform a communication process. The communication process includes wirelessly communicating in accordance with a multiple input multiple output (MIMO) scheme using a plurality of transceiver circuits respectively provided for each of a plurality of antennas; and executing radar wave monitoring on a frequency channel different from a frequency channel in use for wireless communication using one of the plurality of transceiver circuits when the frequency channel in use for the wireless communication is the specific frequency channel.

DETAILED DESCRIPTION OF THE EMBODIMENTS

Figure 1A:
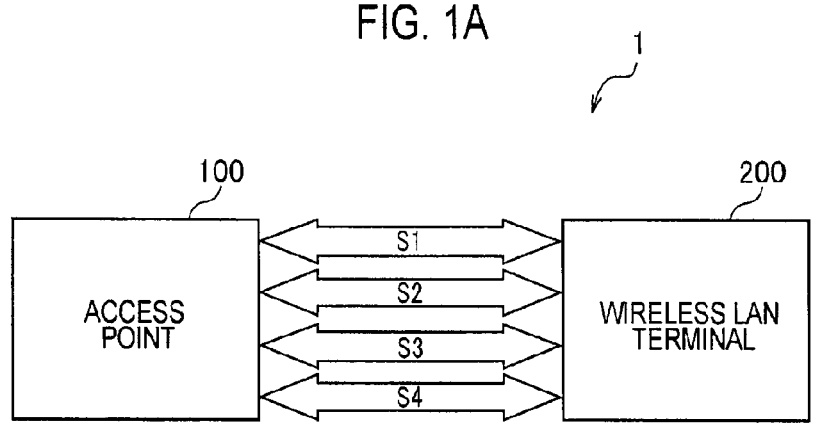
FIG. 1A shows a summary of a wireless LAN system wirelessly communicating in accordance with a single user MIMO (SU-MIMO) scheme.

An embodiment will be described below with reference to the accompanying drawings and in the order of (1) Outline of Wireless LAN System, (2) Configuration of Access Point, (3) Operations of Access Point, (4) Effect of Embodiment, and (5) Other Embodiments. In the drawings, the same or similar components are labeled with the same or similar reference numerals.

(1) Outline of Wireless LAN System

First, an outline of a wireless LAN system 1 of this embodiment will be described. This embodiment will describe a wireless LAN system in compliance with the IEEE 802.11n developed by the IEEE or with the IEEE 802.11 ac currently being developed by the IEEE.

Figure 1B:
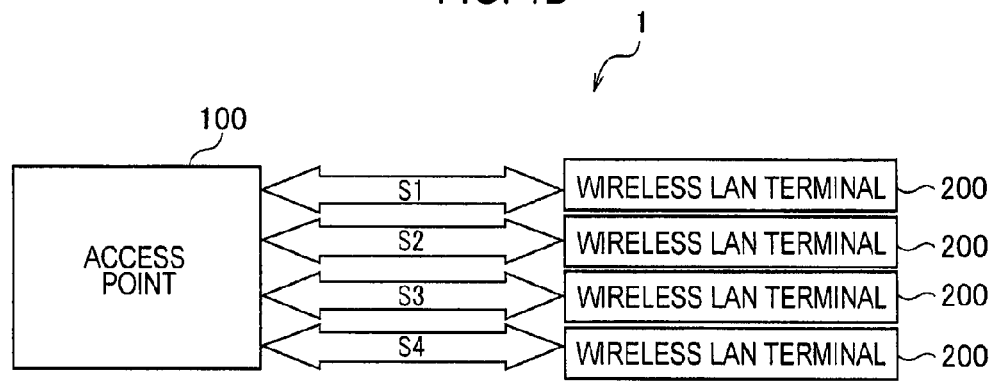
FIG. 1B shows a summary of a wireless LAN system wirelessly communicating in accordance with a multiple user MIMO (MU-MIMO) scheme.

FIGS. 1A and 1B schematically show a wireless LAN system of this embodiment. FIG. 1A shows a wireless LAN system 1 for wirelessly communicating in accordance with a single user MIMO (SU-MIMO) scheme supported by the IEEE 802.11n. FIG. 1B shows a wireless LAN system 1 for wirelessly communicating in accordance with a multiple user MIMO (MU-MIMO) scheme supported by the IEEE 802.11 ac.

The wireless LAN system 1 shown in FIG. 1A includes an access point 100 and a wireless LAN terminal 200. The access point 100 is a fixed wireless LAN device which is connected to a network and is capable of wireless communication. The wireless LAN terminal 200 is a portable wireless LAN device possessed by a user, and is a wireless LAN card, a USB wireless LAN adapter, a wireless LAN-linked game machine, a wireless LAN-linked notebook PC or a wireless LAN-linked mobile phone, for example.

As shown in FIG. 1A, in the SU-MIMO scheme, the access point 100 simultaneously transmits plural streams S1 to S4 in the same frequency band through plural antennas in a signal communication from the access point 100 to the wireless LAN terminal 200 (hereinafter referred to as "downlink"), for example. Meanwhile, the single wireless LAN terminal 200 receives the streams through plural antennas and then splits and extracts the streams. To be more precise, the access point 100 transmits the streams using the different antennas or transmits the streams with different directivities.

The wireless LAN system 1 shown in FIG. 1B includes an access point 1 and plural wireless LAN terminals 200. The access point 100 is a fixed wireless LAN device which is connected to a network and is capable of wireless communication. Each of the plural wireless LAN terminals 200 is a portable wireless LAN device possessed by each user, and is a wireless LAN card, a USB wireless LAN adapter, a wireless LAN-linked game machine, a wireless LAN-linked notebook PC or a wireless LAN-linked mobile phone, for example.

As shown in FIG. 1B, in the accordance with the MU-MIMO scheme, the access point 100 simultaneously transmits plural streams S1 to S4 in the same frequency band through plural antennas on the downlink, for example. Meanwhile, the plural wireless LAN terminal 200 receive the streams through plural antennas and then each of the wireless LAN terminals 200 splits the streams and extracts the stream addressed thereto. To be more precise, the access point 100 transmits the streams with different directivities, and thereby spatially multiplexes (executes spatial multiplexing of) transmission channels for the wireless LAN terminals 200 #1 to 200 #4.

As described above, the SU-MIMO scheme and the MU-MIMO scheme can transmit the multiple streams in parallel in the same frequency band and thus can improve frequency usage efficiency.

Figure 2:
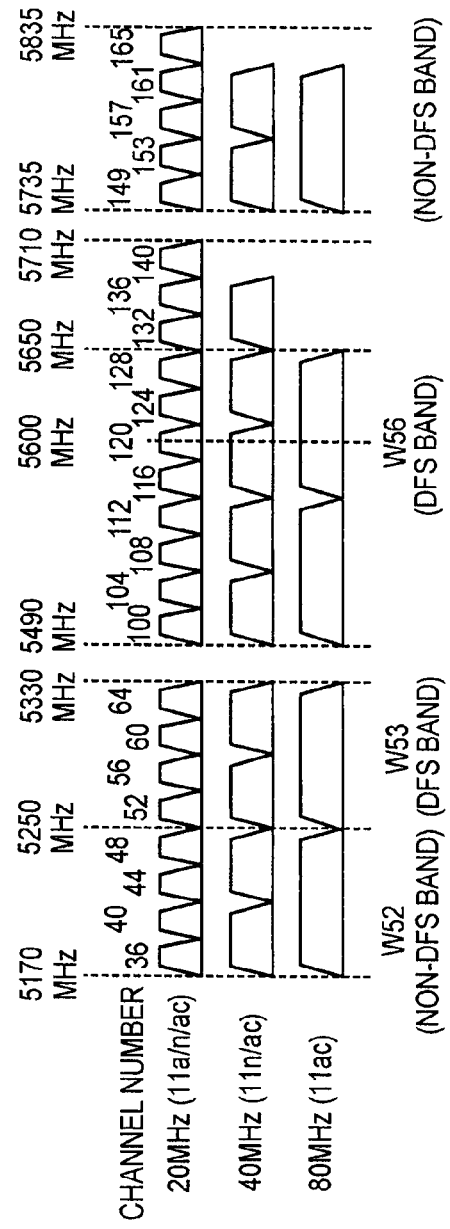
FIG. 2 shows frequency channels included in a 5 GHz band.

In this embodiment, the wireless LAN system 1 can wirelessly communicate by using frequency channels included in the 5 GHz band. FIG. 2 shows the frequency channels included in the 5 GHz band.

As shown in FIG. 2, the wireless LAN system 1 can use frequency channels 36, 40, 44, and 48 included in the 5.15 to 5.25 GHz band called W52, frequency channels 52, 56, 60, and 64 included in the 5.25 to 5.35 GHz band called W53, and frequency channels 100, 104, . . . , and 140 included in the 5.47 to 5.725 GHz band called W56. These channels are referred to as 5 GHz band. Although not available in Japan, frequency channels 149, 153, 157, 161, and 165 included in the 5.735 to 5.835 GHz band can also be used in some countries.

The 5.15 to 5.25 GHz band (W52) is the frequency band not shared with radars and is the non-DFS band which does not require the DFS. The 5.25 to 5.35 GHz band (W53) is the frequency band shared with the radars and is the DFS band which requires the DFS. The 5.47 to 5.725 GHz band (W56) is the frequency band shared with radars and is the DFS band which requires the DFS. The frequency channels 52, 56, 60, and 64 included in the frequency band W53 and the frequency channels 100, 104, . . . , and 140 included in the frequency band W56 will be hereinafter referred to as "specific frequency channels" as appropriate.

According to the IEEE 802.11a, in the wireless LAN system, one frequency channel is used for one wireless LAN system. Meanwhile, it is also possible to bundle and use two frequency channels together in the IEEE 802.11n and to bundle and use four frequency channels together in the IEEE 802.11 ac.

(2) Configuration of Access Point

Figure 3:
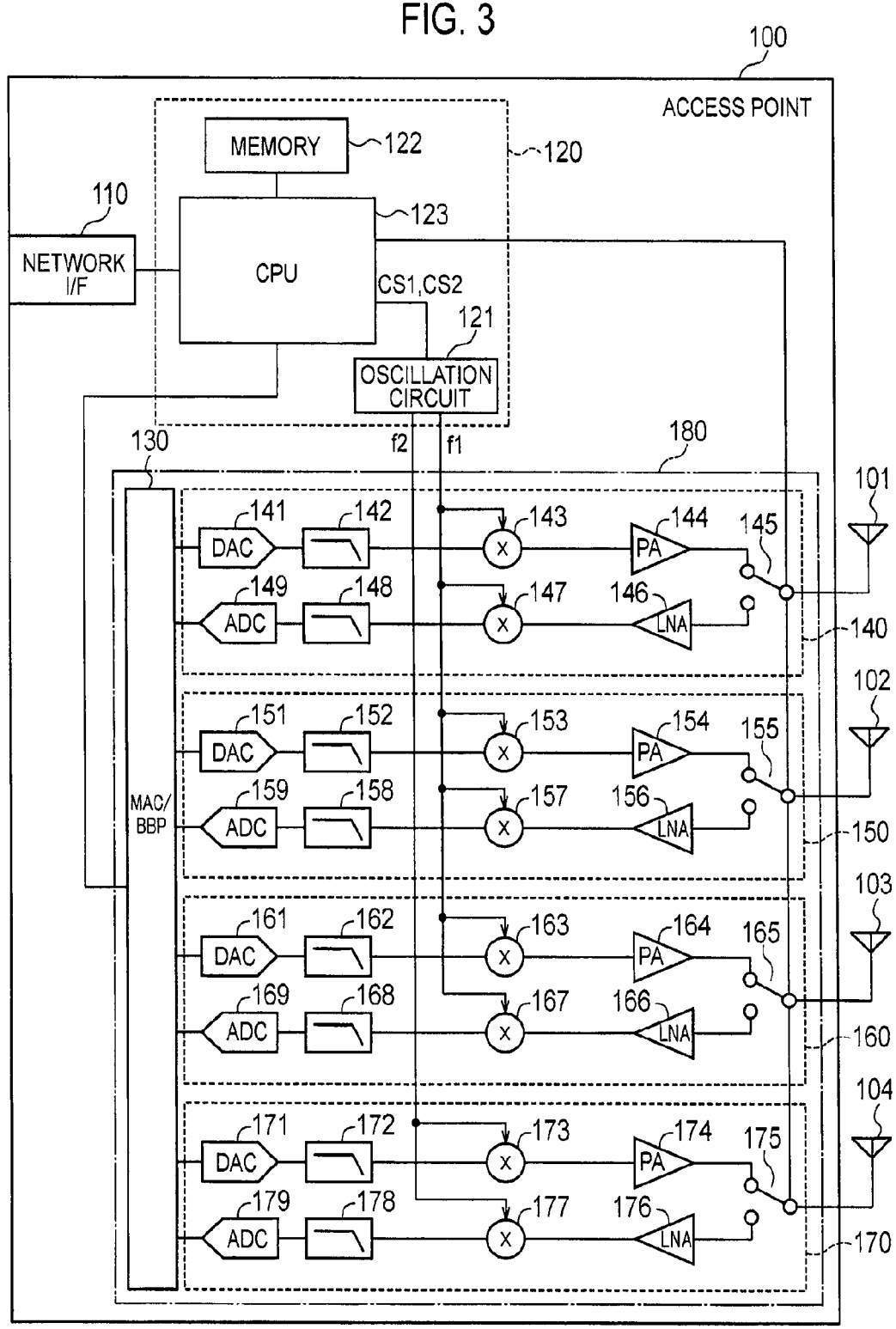
FIG. 3 shows a circuit configuration of an access point of the embodiment of this disclosure.

Next, a configuration of the access point 100 of this embodiment will be described. FIG. 3 shows the configuration of the access point 100.

As shown in FIG. 3, the access point 100 includes plural antennas 101 to 104 for wirelessly communicating in accordance with the MIMO scheme, a wireless communication unit 180 for wirelessly communicating in accordance with the MIMO scheme through the antennas 101 to 104, a network I/F 110 for communicating with a network, and a controller 120. Although four antennas are provided in this example, the number of antennas may be two or eight instead, for example.

The wireless communication unit 180 includes transceiver circuits 140, 150, 160, and 170 respectively provided for the antennas 101 to 104, and a media access controller (MAC)/baseband processor (BBP) 130 connected to the transceiver circuits 140, 150, 160, and 170.

Each of the transceiver circuits 140, 150, 160, and 170 transmits and receives wireless signals through the corresponding one of the antennas. The MAC/BBP 130 is a semiconductor integrated circuit incorporating modules of a MAC module and a BBP module. The MAC module executes transmission and reception based on a frame of a predetermined format, detects errors, and so forth. The BBP module executes modulation/demodulation and encoding/decoding processing for communication signals, and so forth. Moreover, the MAC/BBP 130 executes various types of signal processing necessary for the wireless communication in accordance with the MIMO scheme and various types of signal processing necessary for radar wave monitoring. The signal processing is within the scope of the related art and the detailed description thereof will be omitted.

As a transmission system, the transceiver circuit 140 includes a digital/analog converter (DAC) 141 to which an output from the MAC/BBP 130 is inputted, a filter 142 to which an output from the DAC 141 is inputted, a mixer 143 to which an output from the filter 142 and an oscillation signal f1 are inputted, a power amplifier (PA) 144 to which an output from the mixer 143 is inputted, and a transceiver switch 145 to which an output from the PA 144 is inputted and from which the output is transmitted to the antenna 101. Moreover, as a reception system, the transceiver circuit 140 includes a transceiver switch 145 to which an output from the antenna 101 is inputted, a low noise amplifier (LNA) 146 to which an output from the transceiver switch 145 is inputted, a mixer 147 to which an output from the LNA 146 and the oscillation signal f1 are inputted, a filter 148 to which an output from the mixer 147 is inputted, and an analog/digital converter (ADC) 149 to which an output from the filter 148 is inputted.

As shown in FIG. 3, the circuit configuration and the function of each of the transceiver circuits 150, 160, 170 are similar to the transceiver circuits 140. The oscillation signal f1 is inputted to the mixers of the transceiver circuits 150, 160, 170. The oscillation signal f2 is inputted to the mixer of the transceiver circuit 170.

Here, the constituent components of the wireless communication unit 180 may be at least partially integrated on one chip.

Operations of the transceiver circuits 140, 150, and 160 thus structured will be explained by using the transceiver circuit 140 as an example. For the transmission, the DAC 141 converts a digital signal from the MAC/BBP 130 into an analog signal. The filter 142 removes unnecessary frequency components in the analog signal. The mixer 143 executes up conversion by mixing the output signal from the filter 142 with the oscillation signal f1. The PA 144 amplifies the output signal from the mixer 143. The wireless signal thus obtained is transmitted through the antenna 101 via the transmission reception switch 145. For the reception, a wireless signal received by the antenna 101 is inputted to the LNA 146 via the transmission reception switch 145. The LNA 146 amplifies the wireless signal. The mixer 147 executes down conversion by mixing the output signal from the LNA 146 with the oscillation signal f1. The filter 148 removes unnecessary frequency components in the output signal from the mixer 147. The ADC 149 converts the analog signal from the filter 148 into a digital signal and outputs the digital signal to the MAC/BBP 130. Here, the transmission reception switch 145 is switched under control of a controller 120 when switching between transmission and reception is executed.

In this embodiment, the transceiver circuit 170 may be used for the wireless communication in accordance with the MIMO scheme or may be used as the circuit dedicated to radar wave monitoring. When the transceiver circuit 170 is used for the wireless communication in accordance with the MIMO scheme, the transceiver circuit 170 operates similarly to the transceiver circuits 140, 150, and 160. In this case, an oscillation signal f2 to be inputted to mixers 173 and 177 of the transceiver circuit 170 has a same frequency as that of the oscillation signal f1. When the transceiver circuit 170 is used as the circuit dedicated to radar wave monitoring, the transmission reception switch 175 of the transceiver circuit 170 is fixed on the reception side and the oscillation signal f2 to be inputted to mixers 173 and 177 of the transceiver circuit 170 has a different frequency from that of the oscillation signal f1. In other words, when the transceiver circuit 170 is used as the circuit dedicated to radar wave monitoring, the transceiver circuit 170 is controlled so as to execute reception by using a frequency channel which is different from the frequency channel used for the wireless communication in accordance with the MIMO scheme.

Next, the controller 120 will be described. The controller 120 includes an oscillation circuit 121, a memory 122, and a CPU 123.

Control signals CS1 and CS2 are inputted from the CPU 123 to the oscillation circuit 121. The oscillation circuit 121 outputs the oscillation signal f1 corresponding to the control signal CS1 to the mixers 143, 147, 153, 157, 163, and 167 and outputs the oscillation signal f2 corresponding to the control signal CS2 to the mixers 173 and 177. In this way, the frequency (the frequency channel) of the wireless signals transmitted and received by the transceiver circuits 140, 150, and 160 is controlled independently from the frequency (the frequency channel) of the wireless signals transmitted and received by the transceiver circuit 170.

The memory 122 is connected to the CPU 123 and includes a non-volatile memory for storing programs to be executed by the CPU 123 and information necessary for processing based on the programs, and a volatile memory for temporarily storing data to be processed by the CPU 123. The memory 122 stores information for determining priorities of the frequency channels to be used for the wireless communication in advance. For example, the memory 122 stores a channel number of a default frequency channel, a channel number (CH1) of a first frequency channel after switching, a channel number (CH2) of a second frequency channel after switching, a channel number (CH3) of a third frequency channel after switching, and a channel number (CH4) of a fourth frequency channel after switching.

The CPU 123 is connected to the transceiver switches 145, 155, 165, and 175, the MAC/BBP 130, the oscillation circuit 121, the memory 122, and the network I/F 110. The CPU 123 controls the transceiver switches 145, 155, 165, and 175, the MAC/BBP 130, the oscillation circuit 121, the memory 122, and the network I/F 110, by executing the programs stored in the memory 122.

Figure 4:
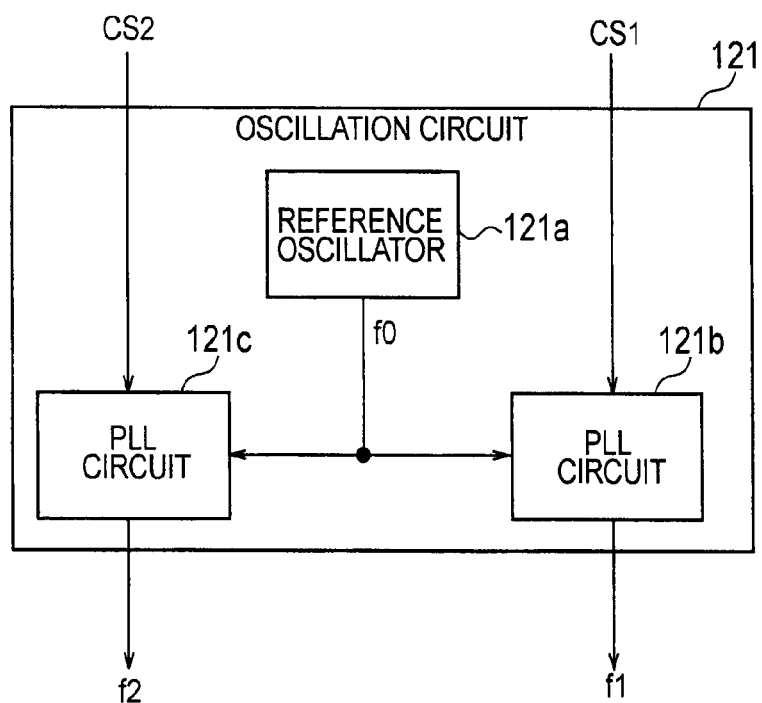
FIG. 4 is a block diagram of an oscillation circuit of the embodiment of this disclosure.

Next, a configuration of the oscillation circuit 121 will be described. FIG. 4 shows a configuration of the oscillation circuit 121.

As shown in FIG. 4, the oscillation circuit 121 includes a reference oscillator 121a and PLL circuits 121b and 121c. The reference oscillator 121a generates a reference oscillation signal f0 and outputs the reference oscillation signal f0 to the PLL circuits 121b and 121c. The PLL circuit 121b multiplies the reference oscillation signal f0 inputted from the reference oscillator 121a by a multiplying factor corresponding to the control signal CS1 inputted from the CPU 123 and outputs the resultant oscillation signal f1. The PLL circuit 121c multiplies the reference oscillation signal f0 inputted from the reference oscillator 121a by a multiplying factor corresponding to the control signal CS2 inputted from the CPU 123 and outputs the resultant oscillation signal f2.

(3) Operations of Access Point

Next, operations of the access point 100 will be described in the order of (3. 1) Overall Operations, (3. 2) First Detailed Operation Example in Second Operation Mode, and (3. 3) Second Detailed Operation Example in Second Operation Mode.

(3. 1) Overall Operations

Figure 5:
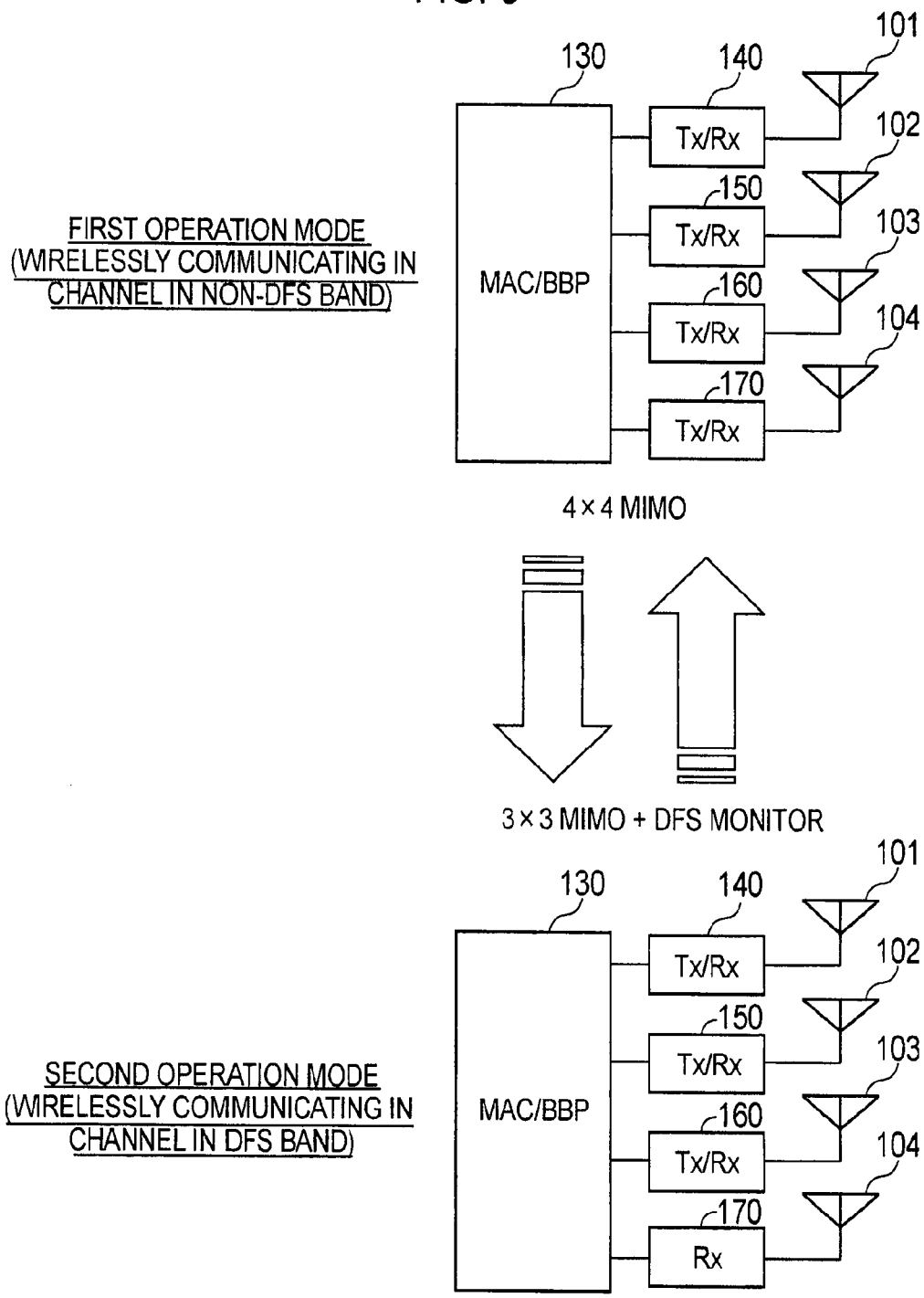
FIG. 5 is a diagram for describing overall operations of the access point of the embodiment of this disclosure.

FIG. 5 describes overall operations of the access point 100. The overall operations of the access point 100 will be described below with reference to FIG. 3 and FIG. 5. Here, "4×4" in FIG. 5 represents usage of four antennas for transmission and four antennas for reception in the wireless communication. Meanwhile, "3×3" therein represents usage of three antennas for transmission and three antennas for reception in the wireless communication.

As shown in FIG. 5, the controller 120 switches an operation mode of the wireless communication unit 180 depending on whether or not the frequency channel in use for the wireless communication in accordance with the MIMO scheme is any of the specific frequency channels (i.e. the frequency channel included in the DFS band).

To be more precise, the controller 120 determines a first operation mode as the operation mode of the wireless communication unit 180 when the frequency channel in use for the wireless communication in accordance with the MIMO scheme is not the specific frequency channel. On the other hand, the controller 120 determines a second operation mode as the operation mode of the wireless communication unit 180 when the frequency channel in use for the wireless communication in accordance with the MIMO scheme is the specific frequency channel.

In the first operation mode, the controller 120 causes the wireless communication unit 180 to wirelessly communicate in accordance with the MIMO scheme by using all of the transceiver circuits 140, 150, 160, and 170.

On the other hand, in the second operation mode, the controller 120 causes the wireless communication unit 180 to wirelessly communicate in accordance with the MIMO scheme by using the transceiver circuits 140, 150, and 160 while using the transceiver circuit 170 for radar wave monitoring on the frequency channel other than the frequency channel in use for the wireless communication in accordance with the MIMO scheme. This radar wave monitoring includes the above-described CAC.

The controller 120 controls the radar wave monitoring using the transceiver circuit 170 in accordance with the information on the channel priorities stored in the memory 122. When the frequency channel used as the default by the transceiver circuits 140, 150, and 160 is the specific frequency channel, the controller 120 firstly monitors the radar waves in the first frequency channel after switching, and then monitors the radar waves in the second frequency channel after switching using the transceiver circuit 170. Details of this monitoring process will be described later.

Meanwhile, in the second operation mode, the transceiver circuits 140, 150, and 160 execute the above-described ISM while wirelessly communicating in accordance with the MIMO scheme. When a radar wave is detected in the channel in use as a result of the ISM, the controller 120 causes the wireless communication unit 180 to switch the frequency channel from the frequency channel in use to the frequency channel in which no radar waves are detected by the radar wave monitoring using the transceiver circuit 170.

(3. 2) First Detailed Operation Example in Second Operation Mode

Next, a first detailed operation example in the second operation mode will be described in the order of (3. 2. 1) Radar Wave Monitoring Process of First Detailed Operation Example, (3. 2. 2) Communication Process of First Detailed Operation Example, and (3. 2. 3) State Transition of First Detailed Operation Example.

The access point 100 wirelessly communicates with the wireless LAN terminal 200 by using a preset frequency channel, an SSID, a WEP key, and the like. Among these, the frequency channel has a default preset value. But if the radar wave is detected when communicating on the frequency channel in the 5 GHz band, it is necessary to change the frequency channel in order to continue the communication.

In the following description, the default frequency channel will be referred to as a "default CHD" and the frequency channel numbers after switching will be referred to as "switching destinations CH1, CH2, CH3, and CH4".

(3. 2. 1) Radar Wave Monitoring Process of First Detailed Operation Example

Figure 6:
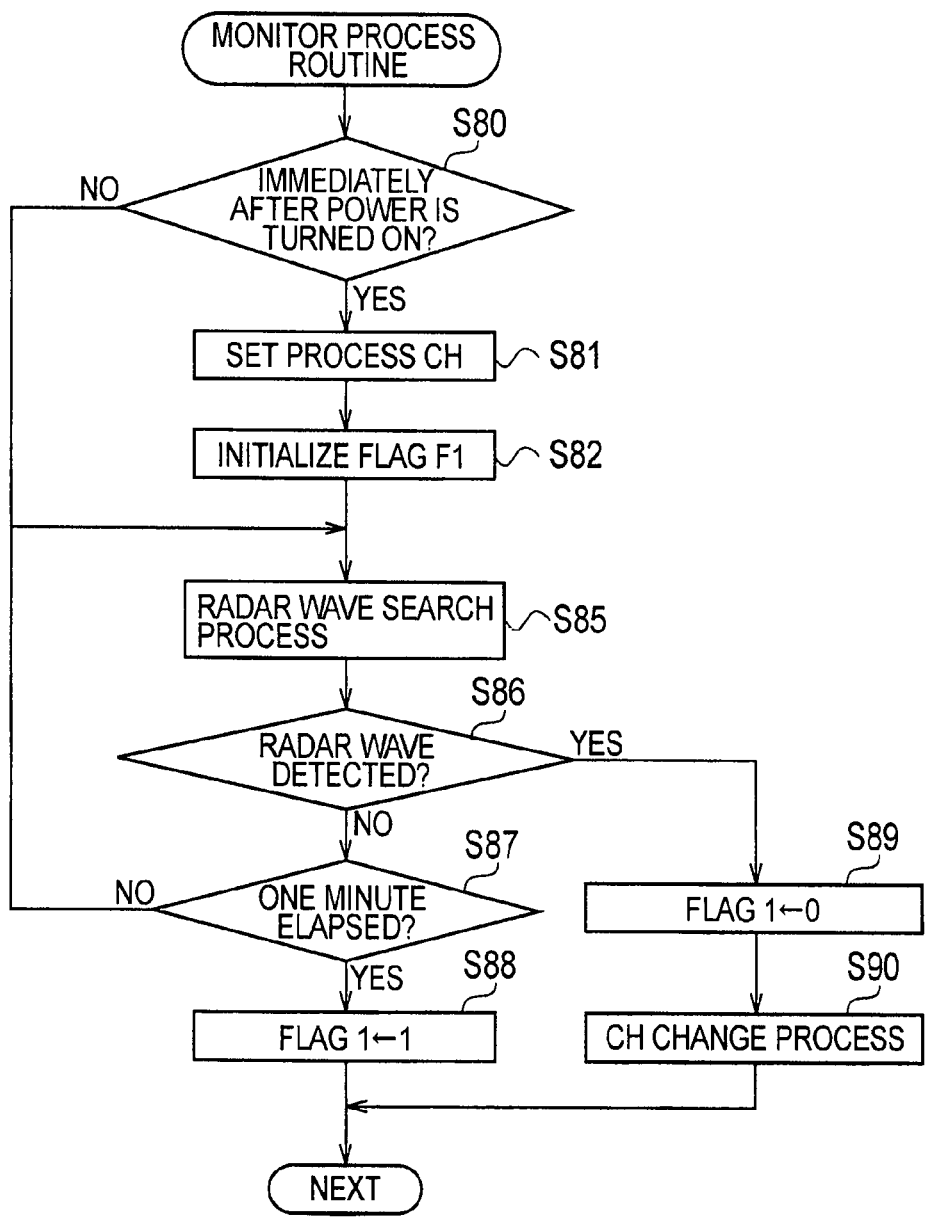
FIG. 6 is a flowchart of a radar wave monitoring process as a first detailed operation example of the embodiment of this disclosure.

FIG. 6 is a flowchart of a radar wave monitoring process in the first detailed operation example. In the second operation mode, the radar wave monitoring process is repeatedly executed at a predetermined interval by using the transceiver circuit 170.

As shown in FIG. 6, when a radar wave monitoring process routine is initiated at the predetermined interval, the CPU 123 of the access point 100 firstly checks whether or not the device is immediately after being turned on in Step S80.

A monitored frequency channel and other parameters are not set immediately after the device is turned on. Accordingly, the CPU 123 sets up an initial monitored frequency channel in Step S81. The default frequency channel CHD for executing wireless LAN communication and the switching destinations CH1, CH2, CH3, and CH4 representing the frequency channels of the after switching when the default CHD becomes unavailable due to detection of the radar wave are stored in the memory 122 in advance. When the power is turned on, the CPU 123 makes reference to the contents in the memory 122 and sets the frequency channel used for the wireless communication to the default CHD and sets the frequency channel for the radar wave monitoring process to the switching destination CH1.

In Step S82, the CPU 123 initializes a flag F1 which reflects a condition of the frequency channel of the monitoring target. The flag F1 is the value set in a predetermined address in the memory 122 and initialization is the process to write a value 0 in the address. Along with the initialization of the flag F1, the channel number of the frequency channel targeted for the radar wave monitoring process is written in an address +1 subsequent to the flag F1.

In Step S85, the CPU 123 starts processing of searching for the radar wave on the frequency channel set as the monitoring target. In the case other than the state immediately after the power is turned on, the CPU 123 searches for the frequency channel of the monitoring target without executing the above-described steps S81 and S82.

In Step S86, the CPU 123 checks whether or not the radar wave is detected in the frequency channel set as the monitoring target. Here, the CPU 123 can check whether or not the radar wave is detected in the frequency channel of the monitoring target (i.e. whether or not there is interference) by communicating information with the MAC/BBP 130.

When no radar waves are detected (NO in Step S86), the CPU 123 checks whether or not one minute has elapsed after starting the search in the frequency channel of the monitoring target in Step S87. The process returns to Step S85 if the CPU 123 confirms that one minute has not elapsed yet (NO in Step S87).

On the other hand, if no radar waves are detected for one minute or longer after starting the search on the frequency channel of the monitoring target (YES in Step S87), then in Step S88, the CPU 123 establishes a state of executing radar wave monitoring (the ISM) for continuous use of the frequency channel of the monitoring target and sets up the above-described flag F1 in the predetermined address in the memory 122. To be more precise, the CPU 123 writes a value 1 in the predetermined address. In this state, the value 1 is set to the flag F1 and the address +1 next the flag F1 is set to the frequency channel number targeted for radar wave monitoring for the continuous use. This frequency channel number will be used in a communication process to be described later.

On the other hand, if the radar wave is detected (YES in Step S86) as a result of searching in the frequency channel of the monitoring target in Step S85, the CPU 123 changes the frequency channel of the monitoring target, resets the flag F1 to the value 0 (Step S89), and switches the frequency channel of the monitoring target (Step S90). The flag F1 is reset by setting the corresponding address to the value 0. Meanwhile, the subsequent switching destination CH is set to the frequency channel of the monitoring target. Here, the frequency channels of the monitoring target may also be determined at random upon detection of the radar wave.

When the radar wave monitoring process routine described above is repeatedly executed at the predetermined interval, the flag F1 located in the predetermined address in the memory 122 is set to the value 1 if no radar waves are detected for a period of one minute or longer in the frequency channel of the monitoring target. In this case, the frequency channel corresponding to the number set to the next address +1 is being subjected to the radar wave monitoring for the continuous use. On the other hand, if the radar wave is detected, this flag F1 is once reset to the value 0 and the frequency channel of the monitoring target is sequentially changed until finding the frequency channel without detection of any radar waves thereon.

The flag F1 is set if no radar waves are detected for one minute or longer in the changed frequency channel. Accordingly, in a communication process routine to be described below, it is possible to detect the condition of the frequency channel in the radar wave monitoring at any time by making reference to the value of this flag F1. Moreover, it is possible to confirm whether or not there is a frequency channel in which no radar waves are detected for one minute or longer by making reference to the value of the flag F1.

(3. 2. 2) Communication Process of First Detailed Operation Example

Figure 7:
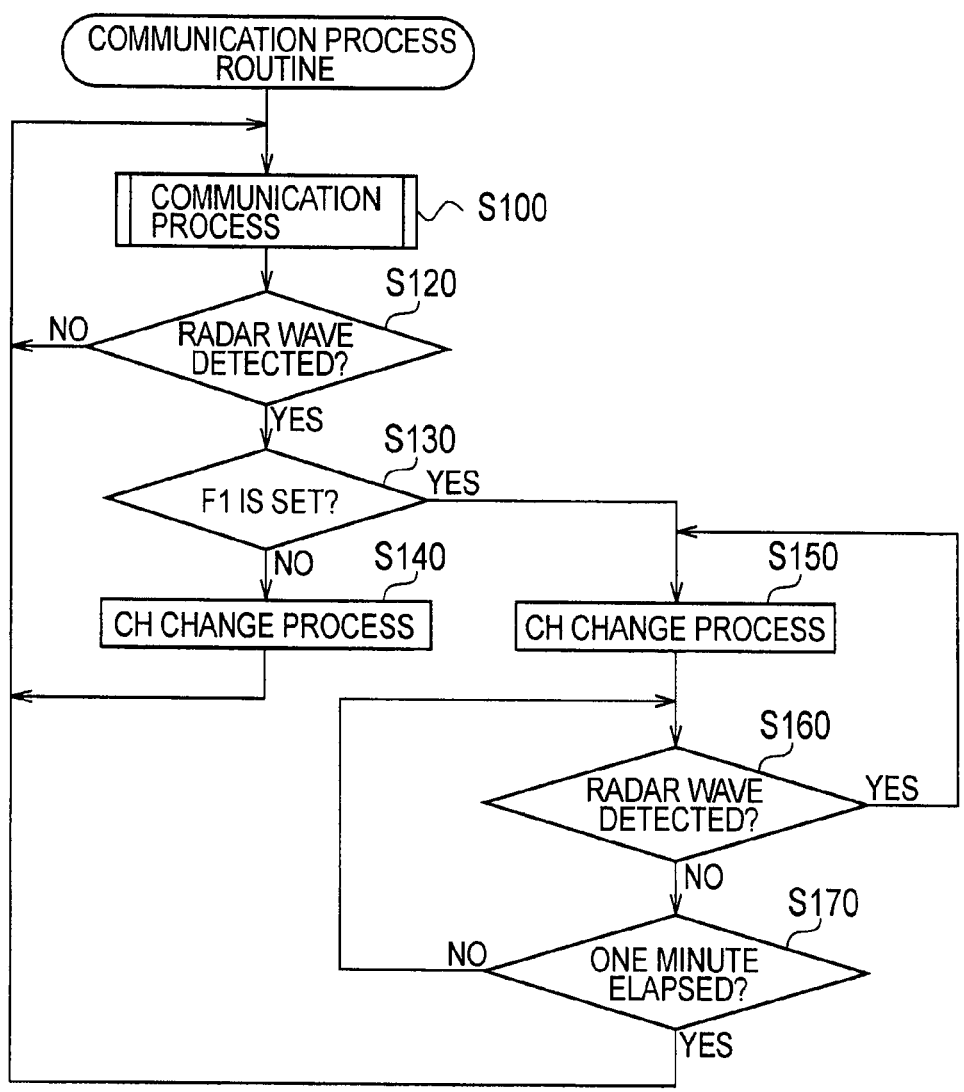
FIG. 7 is a flowchart of a communication process as the first detailed operation example of the embodiment of this disclosure.

FIG. 7 is a flowchart of a communication process in the first detailed operation example.

After execution of a normal communication process with the wireless LAN terminal 200 in Step S100, the CPU 123 checks whether or not any radar waves are detected in Step S120. The existence of the radar wave can be found out by making an inquiry to the wireless communication unit 180. When no radar waves are detected, the communication process directly returns to Step S100 and the wireless communication is continued.

On the other hand, when the radar wave is detected (YES in Step S120), the CPU 123 makes reference to the value of the flag F1 set to the predetermined address in the memory 122 and checks whether or not the flag F1 is set to the value 1 in Step S130.

If the flag F1 is set to the value 1, there is the frequency channel in which no radar waves are detected for one minute or longer in the radar wave monitoring process routine. Subsequently in Step S140, the CPU 123 changes the frequency channel to another frequency channel in which the radar wave is detected. As described previously, it is necessary to stop using a frequency channel within 10 seconds after the radar wave is detected in the frequency channel. Accordingly, the use of the frequency channel is stopped and the frequency channel is changed to another frequency channel immediately.

The new frequency channel as the change destination has been confirmed as the frequency channel in which no radar waves are detected for one minute or longer as a result of the radar wave monitoring process routine, and this new frequency channel has also been subjected to the ISM (Step S83) thereafter. Accordingly, this frequency channel can be used as the frequency channel for communication immediately without another waiting period of one minute.

After completion of Step S140, the process returns to Step S100 to execute the normal communication process. To be more precise, the CPU 123 causes the wireless communication unit 180 to broadcast a beacon signal immediately in the changed frequency channel. The wireless LAN terminal 200 located in a communication range covered by the access point 100 detects this beacon signal and changes the frequency channel to be used by the wireless LAN terminal 200. This is a typical procedure for changing the frequency channel in the wireless LAN.

In this embodiment, the access point 100 does not notify the wireless LAN terminal 200 of the switching destination when the frequency channel is changed. Instead, it is also possible to notify the value set in the address +1 next to the flag F1 as the frequency channel of the switching destination. Upon detection of the radar wave, the access point 100 needs to stop using the frequency channel within 10 seconds. Here, the access point 100 can continue communication using this frequency channel for a period equal to or below 10 second and within a total transmission period equal to or below 260 ms. Accordingly, it is possible to notify the wireless LAN terminal 200 located within the communication range of the wireless LAN and communicating with the access point 100 of the frequency channel of the switching destination. Here, it is possible not only to notify the number of the frequency channel but also to notify the fact that this frequency channel has undergone the CAC.

In the meantime, if the flag F1 is not set to the value 1 in Step S130, the CPU 123 executes a process to change the frequency channel in Step S150. Moreover, the CPU 123 checks whether or not the radar wave is detected in Step S160. When no radar waves are detected, the CPU 123 checks whether or not another minute has elapsed after changing the frequency channel in Step S170.

When one minute has not elapsed yet, the CPU 123 returns the process to Step S160 and then repeats the above-described process. Then, if no radar waves are detected for one minute after the process for changing the frequency channel, the frequency channel is determined to have undergone the CAC and the CPU 123 returns to the normal communication process (Step S100). Here, the reason for checking detection of the radar waves for one minute is for satisfying standards of a DFS process.

In case where the radar wave is detected again during this one-minute period, the CPU 123 returns the process to Step S150 and changes the frequency channel for communication to another frequency channel. Thereafter, whether the radar waves are detected is checked for one minute in a similar manner (Steps S160 and S170). Then the CPU 123 returns to the normal communication process (Step S100) when no radar waves are detected for one minute.

After returning to the communication process (Step S100), the access point 100 immediately broadcasts the beacon signal by using the changed frequency channel. The wireless LAN terminal 200 located in the communication range of the wireless LAN receives the beacon signal and detects the changed frequency channel and set the own communication frequency channel. Then, the wireless LAN terminal 200 communicates with the access point 100.

(3. 2. 3) State Transition of First Detailed Operation Example

Figure 8:
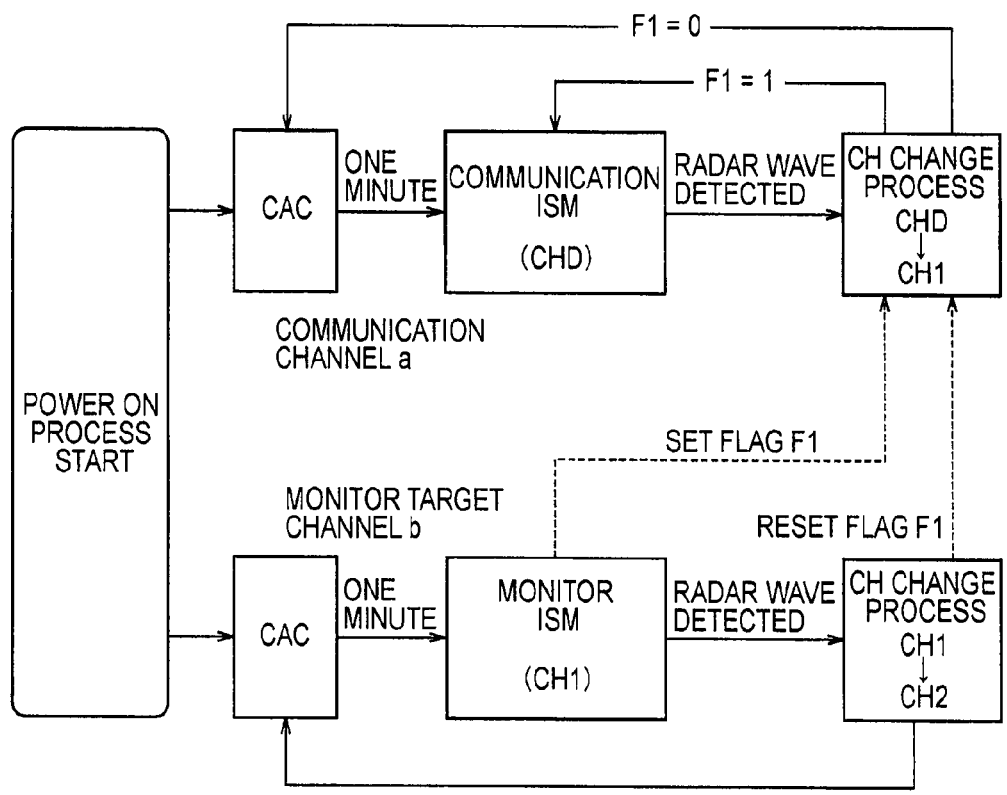
FIG. 8 shows state transitions of a communication system and a monitoring system as the first detailed operation example of the embodiment of this disclosure.

FIG. 8 shows state transitions of a communication system and a monitoring system in the first detailed operation example. FIG. 8 shows the case of detecting the radar waves in the wireless communication using the transceiver circuits 140, 150, and 160 when the switching destination CH1 is monitored by using the transceiver circuit 170 and is set to the monitored state (the ISM) for the continuous use.

As shown in FIG. 8, when the monitoring system is in the condition of the ISM (F1=1), it is possible to return to the communication ISM after changing the default CHD being the frequency channel used by the transceiver circuits 140, 150, and 160 into the monitored switching destination CH1. It is possible to use this frequency channel immediately.

On the other hand, if the monitoring system is not in the condition of the ISM when detecting the radar waves (F1=0), the frequency channel can be switched but the transceiver circuits 140, 150, and 160 transit to the CAC.

In this embodiment, the radar waves are detected for one minute by using the transceiver circuits 140, 150, and 160 when the flag F1 is not set at the time of detecting the radar waves. Instead, it is also possible to wait for a result from the monitoring system (F1=1) or to use the earlier received one of the results from the communication system (the transceiver circuits 140, 150, and 160) and from the monitoring system (the transceiver circuit 170).

(3. 3) Second Detailed Operation Example in Second Operation Mode

Figure 9:
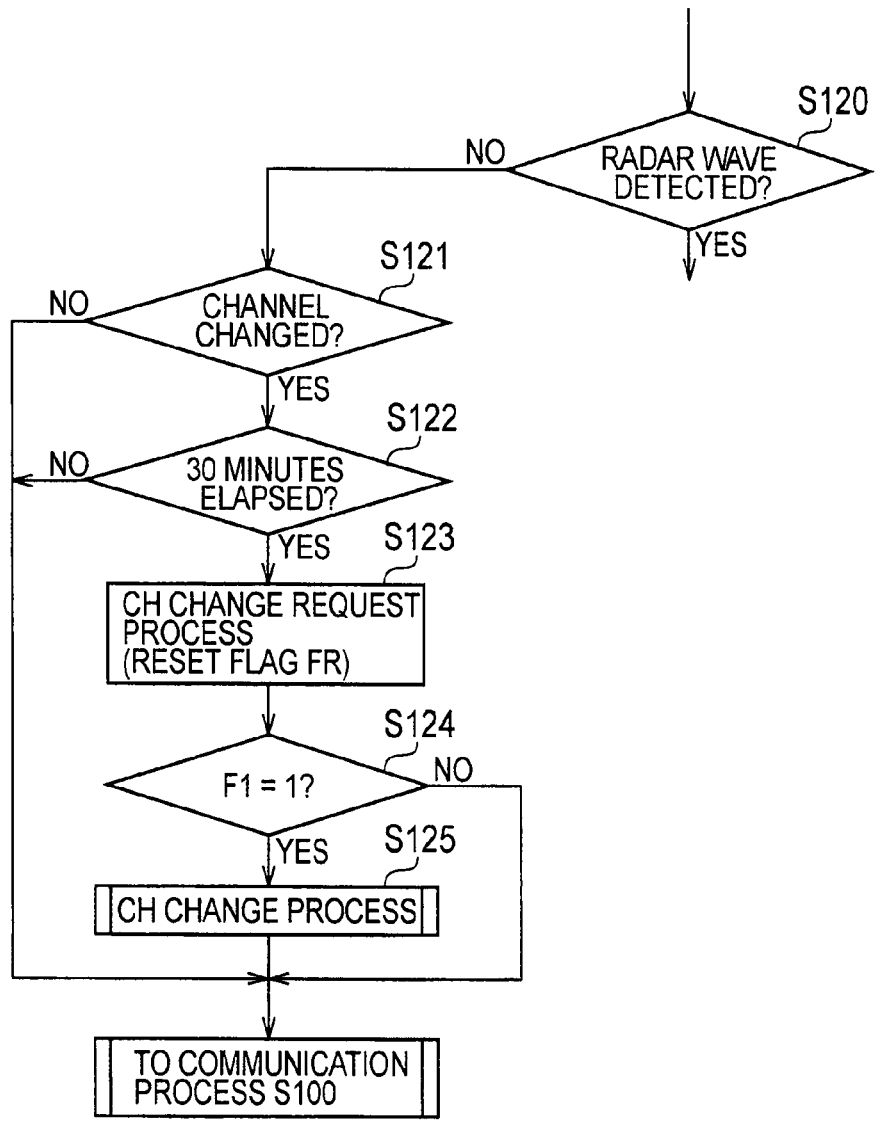
FIG. 9 is a flowchart of a radar wave monitoring process as a second detailed operation example of the embodiment of this disclosure.
Figure 10:
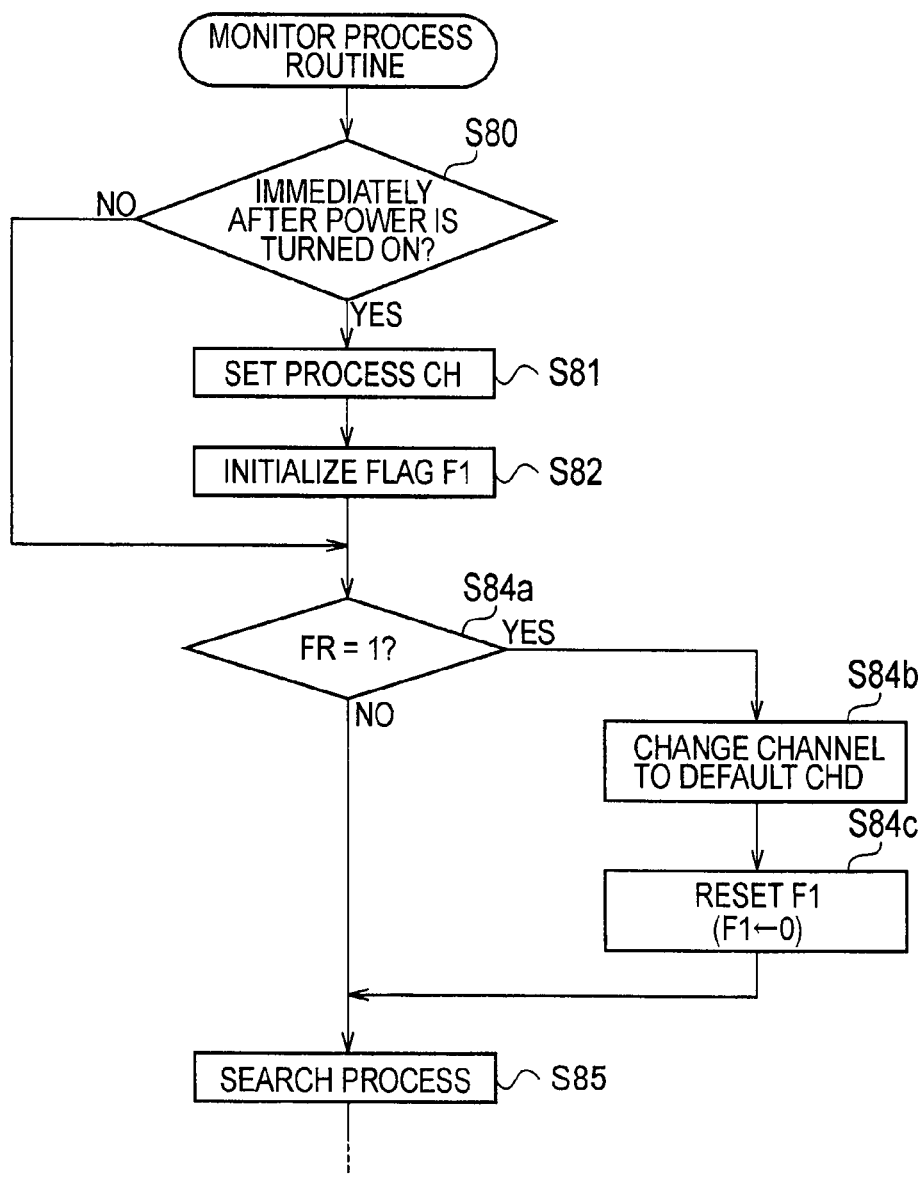
FIG. 10 is a flowchart of a communication process as the second detailed operation example of the embodiment of this disclosure.
Figure 11:
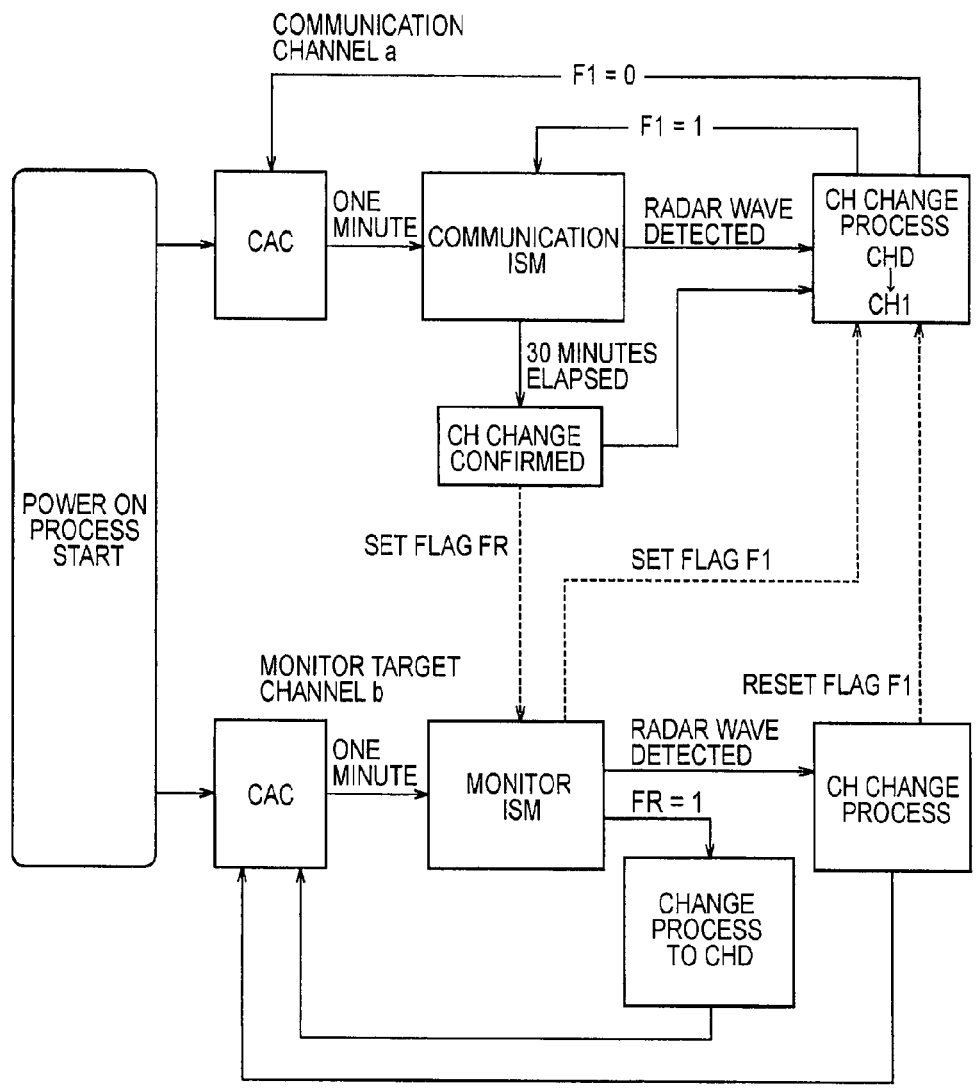
FIG. 11 shows state transitions of a communication system and a monitoring system as the second detailed operation example of the embodiment of this disclosure.

Next, a second detailed operation example in the second operation mode will be described. In the second detailed operation example, features of the processes to be executed by the access point 100 different from those in the above-described first detailed operation example are described. FIG. 9 is a flowchart of a radar wave monitoring process in the second detailed operation example. FIG. 10 is a flowchart of a communication process in the second detailed operation example. FIG. 11 shows state transitions of a communication system and a monitoring system in the second detailed operation example.

As shown in FIG. 9, when no radar waves are detected in Step S121, the CPU 123 checks whether or not a channel used for communication is changed from the initially set channel instead of directly returning to the communication process.

If the channel used for communication is changed from the default CHD, the CPU 123 checks whether or not 30 minutes have elapsed after the change by using a timer incorporated in the CPU 123 in Step S122. When the channel is not changed or when the channel is changed but the elapsed time after the change is shorter than 30 minutes, the CPU 123 directly returns to the normal communication process without executing anything, and continues the communication process.

On the other hand, when the channel is changed from the default CHD and 30 minutes or more have elapsed after the change, the CPU 123 sets up a flag FR for channel returning in order to recover the original condition of the channel. To be more precise, an initial value 0 in the flag FR is replaced with a value 1.

In a radar wave monitoring process routine shown in FIG. 10, a check in Step S84a, i.e. the check as to whether or not the flag FR showing a request for returning to the default channel is set to the value 1, turns out to be "YES". Accordingly, the default CHD is set to the channel targeted for monitoring by the monitoring system (Step S84b) and the flag F1 is reset to the value 0 to start monitoring (Step S84c).

Thereafter, a process of searching for presence of interference with the default CHD thus set (Step S85) and subsequent processes are executed. When the monitoring process routine completes the CAC process on the newly set channel, the flag F1 is set to the value 1.

Here, the radar wave may be detected again when monitoring the default CHD thus set. In this case, the flag FR is reset in Step S90 described in the first detailed operation example. In addition, the timer counting the time since the change of the default CHD is reset as well.

When the flag FR is set in Step S123, the flag F1 is soon reset in the radar wave monitoring process routine. Therefore, the flag F1 is not set to the value 1 unless the CAC process is completed in the radar wave monitoring process routine. When the CAC process is completed and the value 1 is set to the flag F1, a check in Step S124 turns out to be "YES". Hence the channel for communication is changed to the default CHD (Step S125) and the CPU 123 directly returns to the communication process.

As shown in FIG. 11, in the second detailed operation example, the flag FR is set when 30 minutes have elapsed after detecting the radar waves and changing the channel in use into the switching destination CH1. Meanwhile, the monitoring system transits to the process for changing the monitored channel into the default CHD.

Thereafter, the CAC is executed and, one minute after, the flag F1 is set. The transceiver circuits 140, 150, and 160 check the flag F1 when 30 minutes have elapsed, then transit to the process for changing the channel, then change the channel for communication into the default CHD, and then transit to the communication ISM.

As a result, the processes similar to those in the first detailed operation example are carried out in the second detailed operation example. In addition, it is possible to bring the channel for communication back to the default CHD when 30 minutes have elapsed after the channel for communication is once changed from the default CHD.

(4) Effect of Embodiment

As described above, when the frequency channel in use for the wireless communication is the specific frequency channel shared by the radar and the wireless LAN system (i.e. the frequency channel included in the DFS band), the access point 100 of this embodiment monitors the radar waves on the frequency channel other than the frequency channel in use by using the transceiver circuit 170 among the transceiver circuits 140, 150, 160, and 170 used for the wireless communication in accordance with the MIMO scheme.

In this way, it is possible to monitor the radar waves on the different frequency channel while wirelessly communicating on the frequency channel included in the DFS band. Accordingly, even when the radar wave is detected in the frequency channel in use, it is possible to avoid occurrence of a communication failure of the access point 100 over a long period.

Moreover, the radar wave monitoring is carried out with the transceiver circuit 170 among the transceiver circuits 140, 150, 160, and 170 used for the wireless communication in accordance with the MIMO scheme. Accordingly, it is not necessary to add a circuit dedicated to radar wave monitoring and thus, it is possible to suppress increases in the size and costs of the access point 100.

Therefore, of this embodiment, it is possible to provide the access point 100 which is capable of avoiding occurrence of a communication failure over a long period while suppressing increases in the size and costs.

In this embodiment, when the radar wave is detected in the frequency channel in use, the access point 100 switches from the frequency channel in use to the frequency channel in which no radar waves are detected by radar wave monitoring using the transceiver circuit 170. In this way, when the radar wave is detected in the frequency channel in use, it is possible to promptly switch to the frequency channel in which no radar waves are detected and thereby to resume the communication promptly.

In this embodiment, when the frequency channel in use is the specific frequency channel, the access point 100 wirelessly communicates in accordance with the MIMO scheme by using the transceiver circuits 140, 150, and 160 while monitoring the radar waves by using the transceiver circuit 170. Accordingly, it is possible to improve frequency usage efficiency by means of MIMO transmission and thereby to achieve high-speed data transmission.

In this embodiment, when the frequency channel in use is not the specific frequency channel, the access point 100 wirelessly communicates in accordance with the MIMO scheme by using all the transceiver circuits 140, 150, 160, and 170. In this way, when the frequency channel in use is not the specific frequency channel, i.e. when the frequency channel in use is the frequency channel included in the non-DFS band, it is possible to further improve frequency usage efficiency by means of the MIMO transmission using all the transceiver circuits and thereby to achieve high-speed data transmission.

In this embodiment, the access point 100 constantly monitors the condition of the different frequency channel in the 5 GHz band while the access point 100 is wirelessly communicating in the specific frequency channel in the same 5 GHz band. The access point 100 stores the monitoring result and the frequency channel number being monitored in the flag F1 and in the address +1 subsequent thereto. Accordingly, when the radar wave is detected in the frequency channel in use, it is possible to promptly switch from the original frequency channel to the different frequency channel depending on the condition of the frequency channel being monitored. In particular, if the frequency channel being monitored is in the state of monitoring (the ISM) for continuous use, then it is possible to check this state based on the value of the flag F1, to change the frequency channel for the wireless LAN into the frequency channel being monitored, and then to output the broadcasting beacon immediately, to resume the wireless communication using the new frequency channel, and thereby to continue the operation of the wireless LAN on the new frequency channel.

(5) Other Embodiments

It should not be understood that the description and drawings which constitute part of this disclosure limit the present disclosure. From this disclosure, various alternative embodiments, examples, and operation techniques will be easily found by those skilled in the art.

The embodiment has mainly described the access point 100 as an example of the wireless LAN device. However, the wireless LAN device according to this disclosure is not limited only to the access point. The wireless LAN device only needs to include the DFS function and to support the wireless communication in accordance with the MIMO scheme. For example, a wireless LAN router may also be employed as the wireless LAN device according to this disclosure.

In this manner, the present disclosure naturally includes various embodiments not specifically described herein.

What is claimed is:

1. A wireless local area network (LAN) device that wirelessly communicates using a specific frequency channel shared by a radar and a wireless LAN system, the wireless LAN device comprising:
   a plurality of antennas;
   a wireless communication unit including a plurality of transceiver circuits respectively provided for each of the plurality of antennas; and
   a controller that controls the wireless communication unit, wherein
   the wireless communication unit wirelessly communicates in accordance with a multiple input multiple output (MIMO) scheme by the plurality of transceiver circuits, and
   the controller controls the wireless communication unit to execute radar wave monitoring on a frequency channel different from a frequency channel in use for wireless communication using one of the plurality of transceiver circuits when the frequency channel in use for the wireless communication is the specific frequency channel.

2. The wireless LAN device according to claim 1, wherein the controller controls the wireless communication unit to switch the frequency channel in use to a frequency channel in which a radar wave is not detected by the radar wave monitoring when a radar wave is detected in the frequency channel in use.

3. The wireless LAN device according to claim 1, wherein when the frequency channel in use is the specific frequency channel, the controller controls the wireless communication unit to execute the radar wave monitoring using the one of the plurality of transceiver circuits and to wirelessly communicate in accordance with the MIMO scheme using the remaining transceiver circuits simultaneously.

4. The wireless LAN device according to claim 1, wherein the controller controls the wireless communication unit to wirelessly communicate in accordance with the MIMO scheme using all of the plurality of transceiver circuits when the frequency channel in use is not the specific frequency channel.

5. The wireless LAN device according to claim 1, wherein the specific frequency channel is a frequency channel included in a frequency band requiring dynamic frequency selection (DFS).

6. A method of communicating performed by a wireless local area network (LAN) device that wirelessly communicates using a specific frequency channel shared by a radar and a wireless LAN system, the method comprising:
wirelessly communicating in accordance with a multiple input multiple output (MIMO) scheme using a plurality of transceiver circuits respectively provided for each of a plurality of antennas; and
executing radar wave monitoring on a frequency channel different from a frequency channel in use for wireless communication using one of the plurality of transceiver circuits when the frequency channel in use for the wireless communication is the specific frequency channel.

7. The method according to claim 6, further comprising:
switching the frequency channel in use to a frequency channel in which a radar wave is not detected by the radar wave monitoring when a radar wave is detected in the frequency channel in use.

8. The method according to claim 6, wherein
when the frequency channel in use is the specific frequency channel, the radar wave monitoring is executed using the one of the plurality of transceiver circuits and the wireless communication in accordance with the MIMO scheme is executed using the remaining transceiver circuits simultaneously.

9. The method according to claim 6, further comprising:
wirelessly communicating in accordance with the MIMO scheme using all of the plurality of transceiver circuits when the frequency channel in use is not the specific frequency channel.

10. The method according to claim 6, wherein
the specific frequency channel is a frequency channel included in a frequency band requiring dynamic frequency selection (DFS).

11. A non-transitory computer-readable medium including computer program instructions, when executed by a wireless local area network (LAN) device that wirelessly communicates using a specific frequency channel shared by a radar and a wireless LAN system, causes the wireless LAN device to perform a communication process comprising:
wirelessly communicating in accordance with a multiple input multiple output (MIMO) scheme using a plurality of transceiver circuits respectively provided for each of a plurality of antennas; and
executing radar wave monitoring on a frequency channel different from a frequency channel in use for wireless communication using one of the plurality of transceiver circuits when the frequency channel in use for the wireless communication is the specific frequency channel.

12. The non-transitory computer-readable medium according to claim 11, the process further comprising:
switching the frequency channel in use to a frequency channel in which a radar wave is not detected by the radar wave monitoring when a radar wave is detected in the frequency channel in use.

13. The non-transitory computer-readable medium according to claim 11, wherein
when the frequency channel in use is the specific frequency channel, the radar wave monitoring is executed using the one of the plurality of transceiver circuits and the wireless communication in accordance with the MIMO scheme is executed using the remaining transceiver circuits simultaneously.

14. The non-transitory computer-readable medium according to claim 11, the process further comprising:
wirelessly communicating in accordance with the MIMO scheme using all of the plurality of transceiver circuits when the frequency channel in use is not the specific frequency channel.

15. The non-transitory computer-readable medium according to claim 11, wherein
the specific frequency channel is a frequency channel included in a frequency band requiring dynamic frequency selection (DFS).

* * * * *